Figure 1:
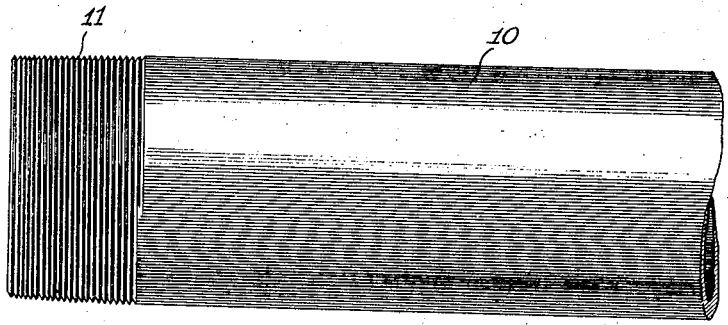

Feb. 1, 1944.    H. E. SOMES    2,340,706
THREADED PIPE END
Filed Dec. 20, 1941

INVENTOR
Howard E. Somes.
BY *John P. Tarbox*
ATTORNEY

Patented Feb. 1, 1944

2,340,706

UNITED STATES PATENT OFFICE 2,340,706

THREADED PIPE END

Howard E. Somes, Detroit, Mich., assignor to Budd Induction Heating, Inc., Philadelphia, Pa., a corporation of Michigan Application December 20, 1941, Serial No. 423,740

2 Claims. (Cl. 285—146)

This invention relates to an improvement in threaded joint connections, more particularly to threaded connections for tubular members of that character which in use are subject to axial tensile loading.

One well known example of a joint connection of this character, to which the present invention is particularly adaptable, is that of the joint coupling employed in joining the pipe sections in an oil well casing, commonly called a casing string.

The pipe sections of an oil well casing, which are in the nature of thin-walled tubes, are threaded at their ends, and the adjacent sections are joined together through external coupling sleeves threaded thereto. The casing string is suspended from its upper end and because of this suspension the sections thereof and the joining couplings are subjected to severe axial tension stresses. This is particularly true of casings set to great depths, such as, for example, depths of nine to twelve thousand feet.

It can be readily appreciated that a casing joint must have sufficient strength to support the total weight of the casing suspended from it and, moreover, that a conventional threaded coupling joint is weaker than the body of the casing pipe by reason of the metal cut away from the casing body during the formation of the threads.

The axial tensile loading of the threaded coupling in combination with the wedging action produced by the angle of the mating threads, creates compression forces which tend to decrease the diameter of the pipe and thereby collapse the same, and it has been found that by reason of this reduction in diameter the threaded ends of the casing sections will release themselves from the surrounding couplings at loads materially less than would be required to fracture or strip the threads. Obviously, therefore, a casing or pipe threaded at its ends is only as strong, when under axial tension loading, as its threaded end. In addition, the specifications for oil well casing specify pipe threads which taper throughout their axial extent. Thus, the metal of the casing pipe surrounded by the threads is not of uniform strength axially.

The primary object of the present invention is to provide a tubular member or pipe having a threaded end in which the total tensile strength of the metal of the pipe underlying the threads is at least as great as the total strength of the metal of the pipe body.

A further object is to provide a pipe end having longitudinally tapering threads with an internal annular zone underlying the threads which is harder than the material of the zone in which the threads are cut and which is of tapering thickness corresponding to the taper of the threads whereby this underlying zone will have a unit strength which is uniformly increased throughout the extent of the threads.

With the above and other objects in view which will be apparent from the following description to those skilled in the art to which the invention appertains, the present invention consists in certain features of construction to be hereinafter described with reference to the accompanying drawing, and then claimed.

Figure 2:
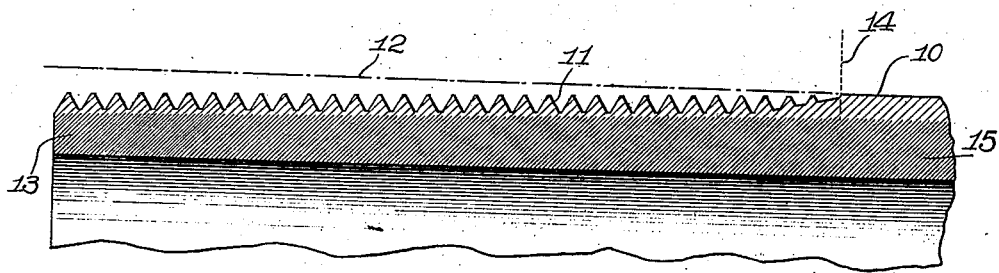

In the drawing, which illustrates a suitable embodiment of the present invention, Figure 1 is a fragmentary portion of a tubular member such as used in oil well casing, showing the threaded end thereof; and Figure 2 is a greatly enlarged longitudinal section taken through the wall of the tubular member of Figure 1 showing the material underlying the threads hardened in accordance with the present invention.

Referring to the accompanying drawing, in which like numerals refer to like parts throughout the views, the pipe 10 shown in Figure 1 is provided at its end with threads 11 for connection with a pipe coupling or adjoining member (not shown). The threads 11 taper from the pipe end radially outwardly toward the pipe body in the desired amount, the dot and dash line 12 of Figure 2 showing the amount of taper, which is the taper ordinarily specified for oil well casing threads.

It is the aim of the present invention to increase the strength of the annular zone underlying and coextensive with the threads 11 by hardening the same to a degree sufficient to provide a desired increase in strength. This zone is indicated by the double shading 13 in Figure 2 and it will be noted that this zone gradually increases or tapers in thickness from the extreme outer end of the threads 11 to a point 14 underlying the inner ends of the threads and then continues at uniform depth, as indicated at 15, into the body of the pipe 10. In order that the threaded end of the pipe will be of uniform unit strength at each axial increment thereof the gradual increase in thickness is made to conform to the taper of the threads 11. It will be seen in Figure 2 that the depth line of the hardened zone is parallel to the root line of the threads.

The hardened internal annular layer 13 is produced through a differential heating and quenching operation wherein this layer is quickly heated to a temperature above $Ac_3$ temperature of the steel and then rapidly quenched. Although various methods may be used to heat the zone to the desired temperature, it is preferable to employ an induction heating method, such as that disclosed and described in my copending application Serial No. 164,320, filed September 17, 1937, which has matured into Patent No. 2,281,331, granted April 28, 1942, wherein an electro-magnetic induction heating element connected with a high power high frequency source of electrical energy is coaxially arranged with the pipe end and while relative axial movement between the heating element and the pipe are effected, the heating element rapidly and progressively generates high frequency heating currents in the annular zone of the pipe end radially inwardly of the zone to be threaded. The rate of energy input and the rate of relative movement are so regulated that the zone to be hardened is heated to hardening temperature and quenched before any of the generated heat can drift to the metal of the pipe end radially outwardly of the internal zone, whereby this outer metal may remain ductile and retain its original hardness, which of course may be that of the original untreated pipe end. As a result, the pipe threads may be cut after the hardening operation and in consequence will not be distorted as often times would be the case if they were cut prior to the hardening operation.

By employing a process such as that defined above and disclosed in my copending application aforesaid, I produce a hardened internal annular zone or layer of gradually increasing thickness, such as the layer 13 of Figure 2, either by gradually increasing the energy input or by gradually diminishing the rate of travel between the heating element and the internal surface being heat treated, that is, when the progressive heating and quenching is effected longitudinally from the extreme end of the pipe. The quenching means, as described in my copending application aforesaid, is arranged to annularly discharge quenching medium to effect quenching substantially immediately upon the metal reaching its hardening temperature. Either the tube or the heating element and quenching means may be axially moved. Also, it is desirable to effect relative rotation between the tube being treated on the one hand and the heating element and quenching means on the other hand to effect or insure uniform heating and quenching.

By employing an induction heating process such as that described, it is possible to obtain a hardened zone which is not only sharply defined but also which is of uniform hardness throughout its radial depth.

Such heat treatment very materially increases the hardness of the internal zone or layer over that in which the threads are to be cut and without increasing the hardness of the thread zone. For example, I have been able to obtain a hardness as high as 60 as measured on the Rockwell C scale. Pipes treated as herein described have been increased in axial tensile strength as high as 75 and 80%.

From the foregoing, it is seen that I have provided a pipe end which is increased in tensile strength materially beyond that of the untreated pipe to compensate for the weakening occasioned by the cutting of the threads and which may have a total strength at least as great as the body of the pipe. Moreover, I have provided a pipe end which has the very advantageous feature that the increase in unit strength of the tapering end is uniform throughout its longitudinal extent. It thus is seen that by having a pipe end of uniformly increasing strength such pipe end is rendered more resistant to radial compression arising from axial tension stresses, and is thus rendered more resistant to thread disengagement from a surrounding coupling or associated member, and that by having the hardened zone parallel the root line of the threads maximum joint strength is provided.

If desired, the pipe casing may be internally hardened throughout its length, in which case the annular zone of uniform depth indicated at 15 in Figure 2 may be extended throughout the length of the pipe.

It is, of course, to be understood that ductility of the hardened zone may be increased, but not without some decrease in strength, by subjecting the same to a drawing temperature, and this may be effected throughout the length of the hardened zone or at localized regions wherein increased ductility is required.

It is to be understood that both ends of the pipe, in the case of an oil well casing section, are threaded in the manner herein described, and that the invention is not limited to oil well casing pipe but is equally applicable to any tubular structure which is to be subjected to similar loading conditions.

Since various changes may be made without departing from the spirit of the invention as will be apparent to those skilled in the art, reference will be had to the appended claims for a definition of the limits of the invention.

What is claimed is:

1. In a tubular metallic structure having longitudinally tapered end threads in a wall surface thereof, means for rendering the tapered threaded region of the structure of uniformly increasing strength from one end to another thereof and for increasing the strength of the structure at said tapered threaded end at least substantially to that which would exist therein prior to hardening and threading, comprising an annular layer of metal of materially greater hardness and yield strength than the hardness and yield strength of the threaded layer of metal, said harder layer being of substantial depth and having its junction with the unhardened layer of the same degree of taper as said threads, the unit strength of said harder layer increasing uniformly from the end of the pipe throughout the threaded area.

2. A tubular structure as set forth in claim 1 in which the harder layer extends longitudinally beyond the threaded end and is of substantially uniform thickness beyond the threaded end.

HOWARD E. SOMES